United States Patent Office 3,474,334
Patented Oct. 21, 1969

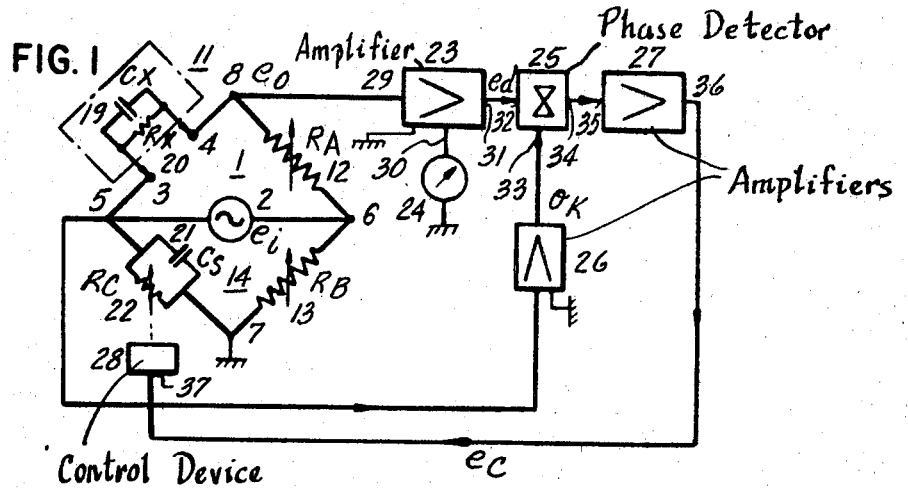
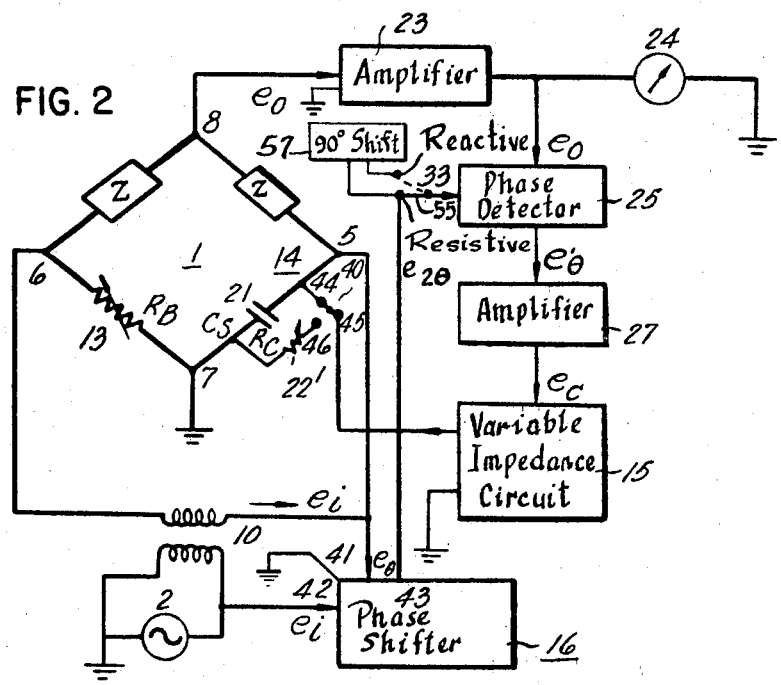

3,474,334
AUTOMATIC NULLING MEASUREMENT BRIDGE USING DOUBLE PHASE ANGLE DETECTION
Giichi Yokoyama, Toshio Muraoka, and Hitoshi Noguchi, Tokyo, Japan, assignors to Yokogawa-Hewlett-Packard, Ltd., Tokyo, Japan, a corporation of Japan
Filed Sept. 15, 1966, Ser. No. 579,555
Claims priority, application Japan, Oct. 7, 1965, 40/61,463
Int. Cl. G01r 27/28, 17/10
U.S. Cl. 324—57
2 Claims

ABSTRACT OF THE DISCLOSURE

An AC bridge having at least one variable element in the branches of bridge circuit which is automatically controlled by the signal from a detector operating on the output of the bridge circuit. The detector responds to a signal having a phase angle relative to signal applied to the bridge which is approximately double the phase angle of signal appearing across the variable element.

---

Bridge circuits for measuring the impedance of a circuit element typically include a variable branch circuit element which is manually adjustable and another branch circuit element which is automatically adjustable in response to the combination of the bridge circuit output and the drive signal to the bridge circuit. One disadvantage of bridge circuits of this type is that the phase of the detected output signal relative to the driving signal near the balance point (or point of minimum detector signal) is dependent upon the impedance phase angle of the element being measured. The sensitivity of a conventional detector operating in a bridge circuit of this type thus varies according to the impedance phase angle of the element being measured. It is therefore difficult to operate such a conventional bridge circuit with high sensitivity over a wide operating range of unknown element impedances.

It is therefore an object of this invention to provide an AC bridge having an automatic control system which functions with substantially uniformly high sensitivity over a wide operating range of measured impedance values.

It is another object of this invention to provide a signal detector which operates at near-maximum detecting efficiency over the operating range of the bridge circuit.

In accordance with the illustrated embodiment of this invention, a phase detector circuit is provided for controlling the variable element of the bridge circuit in response to the phase relationship between the bridge output signal and a reference signal derived preferably from the signal across the signal-controlled branch circuit. The phase of this reference signal varies automatically toward improved sensitivity of the detector circuit. Consequently, the phase detector circuit functions with high efficiency substantially uniformly over a wide operational range of impedance measurement values.

Other and incidental objects of the present invention will be apparent from a reading of this specification and an inspection of the accompanying drawing in which:

FIGURE 1 is a schematic diagram of one embodiment of the present invention;

FIGURE 2 is a schematic diagram of another embodiment of this invention;

Figure 4:
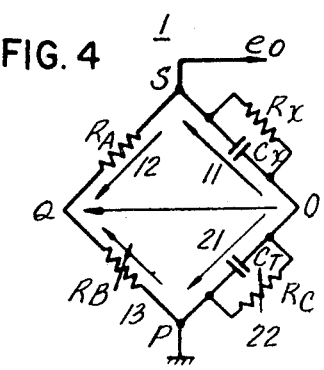
Figure 5:
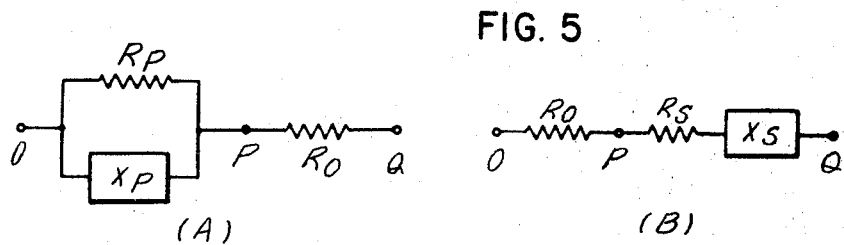
Figure 6:
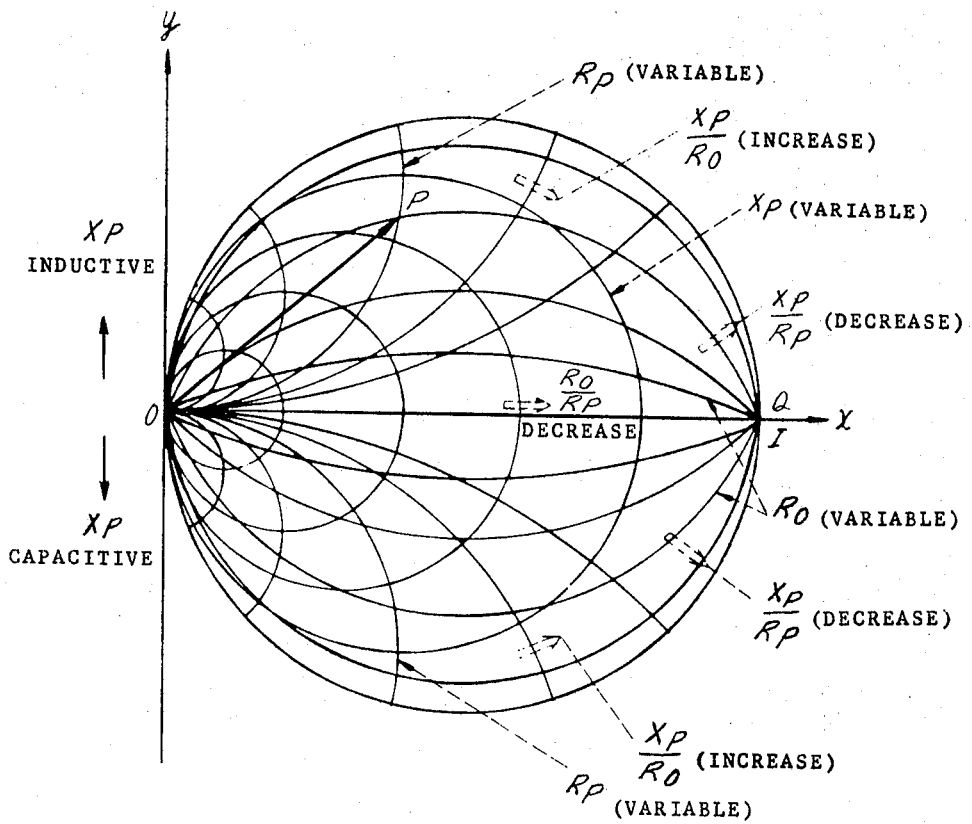
Figure 7:
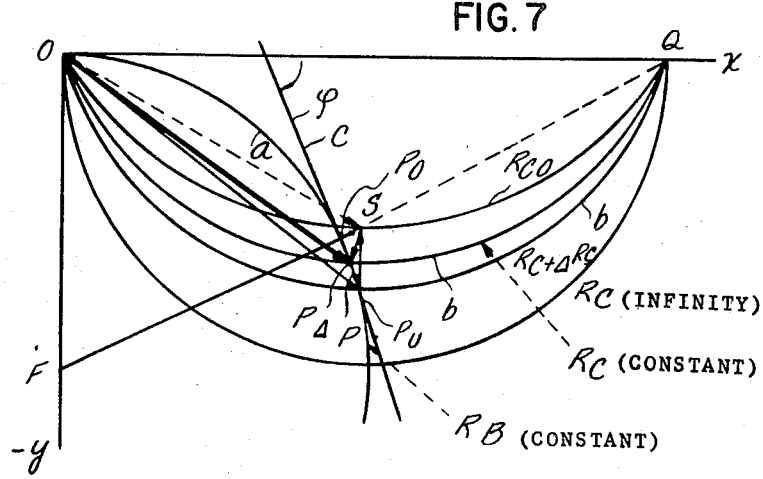
Figure 8:
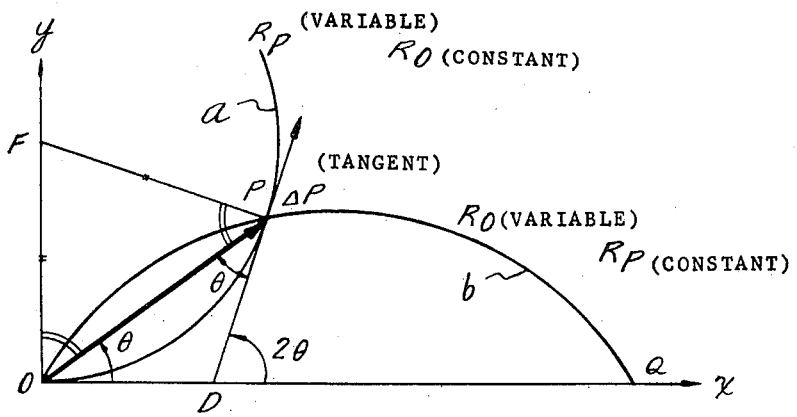

FIGURES 4, 5(A) and 5(B) are equivalent circuits of the bridge for explaining the operation of this invention; and FIGURES 6, 7, and 8 are vector diagrams for explaining the operation of this invention.

Referring to FIGURE 1, there is shown a theoretical circuit diagram of this invention as applied in a semi-automatic AC bridge suitable for measuring a capacitance element. In the diagram, the AC bridge circuit 1 consists of AC source 2, unknown arm 11, first ratio arm resistor 12, second ratio arm resistor 13, and variable impedance 14. The unknown arm 11 includes terminals 3 and 4 for connecting an unknown element 19 such as a capacitor whose constants are indicated equivalently by a parallel circuit of capacitance $C_x$ and resistance $R_x$. First ratio arm resistor 12 and second ratio arm resistor 13 are both manually adjustable resistors. Variable impedance arm 14 comprises a parallel circuit of fixed standard capacitor 21 and variable resistor 22. Variable resistor 22 is continuously variable by control device 28 in response to an applied signal, as explained later on. Unknown arm 11 and first ratio arm resistor 12 are connected in series, and variable impedance arm 14 and second ratio arm resistor 13 are connected in series, and the two foregoing series circuits are connected in parallel to the output terminals 5, 6 of AC power source 2. The common connections 7 and 8 of each series circuit form the two detector outputs of the bridge circuit. The input of AC amplifier 23 is is connected to these outputs and amplifies the output voltage $e_o$ of the bridge circuit at these terminals. The output 31 of amplifier 23 is connected to one input 32 of phase detector 25 for applying $e_d$ thereto as the amplified output $e_o$. Also, indicator 24 is connected to output 30 of AC amplifier 23. The two terminals 5 and 7 of variable impedance arm 14 are connected to the input of AC amplifier 26. Amplifier 26 amplifies the voltage signal which appears across variable impedance arm 14 and the output signal is applied to input 33 of phase detector 25 as its standard phase signal $\theta_k$. A variable phase shifter may be inserted along the circuit which connects variable impedance branch 14 with input 33 of phase detector 25 such that the phase of signal applied to input 33 will either be in-phase with or maintain a constant phase difference with that of the voltage that appears across variable impedance arm 14. Phase detector 25 generates an output signal which varies in response to the phase relationship between the standard phase component of the signal applied to input 32 and the phase of the signal applied to input 33 as the standard signal. Phase detector 25, for example of the type called a ring modulator, receives signals of the same frequency but generally of different phases at its two inputs 32 and 33 and produces an output having an amplitude and polarity representative of the magnitude and phase of the difference between these two input signals. Amplifier 27 amplifies the signal at the output of phase detector 25 and applies its output $e_c$ to control device 28 for controlling the resistance value $R_c$ according to changes of $e_c$. Thus, if variable resistance element 22 is a slide rheostat, a reversible motor whose rotation may be reversed according to the polarity of input signal $e_c$ may be used, and the resistance value may be controlled by the motor rotation in a conventional manner. Also, if resistance element 22 is a light-sensitive resistance element, signal $e_c$ may be converted to corresponding light and the resistance value $R_c$ of resistance element 22 may be controlled by light signal.

The measuring operation of the circuit of FIGURE 1 is briefly explained below. In the diagram, the measurement of unknown capacitor 19 represented by the parallel circuit of unknown equivalent constants $R_x$ and $C_x$, is obtained by manually adjusting the resistance values $R_A$ and $R_B$ for minimum or null deflection of the pointer of indicator 24. If the bandwidth of the automatic control circuit is chosen sufficiently high, the resistance of variable resistor 22 is automatically controlled substantially in time with manual adjustment of elements 12 and 13 such that the amplitude of output signal $e_o$ remains substantially at a minimum in relation to the hand-set position of resistor 13. Thus, the output signal $e_o$ can be readily balanced at zero without requiring excessive balancing adjustment of the branch circuit elements. The setting value $R_B$ of resistance element 13 at balance point provides an accurate indication of the value $C_x$ and the setting value of resistance element 22 provides an indication of the value of loss resistance $R_x$ or loss factor D of the capacitor being measured.

FIGURE 2 is a theoretical circuit diagram of this invention as applied to a semi-automatic universal bridge system. The feature of this system is that the phase $\theta_k$ of the standard signal applied to phase detector 25 for producing control signal $e_c$ (which, in turn, controls variable resistance element 22) changes with impedance phase angle of the element being measured such that the detecting efficiency of detector 25 is substantially at a maximum for all measurement values of unknown impedance. In FIGURE 2, the elements identical to those in FIGURE 1 are designated by the same symbols and the explanations of these elements are shortened for clarity. In this embodiment the branch alignment is the same as in FIGURE 1 for measuring a capacitive reactance element 11. For measuring an inductive reactance element, ratio arm resistor 12 is connected in the 8–5 branch and the reactance element to be measured is connected in the 8–6 branch.

The distinction in this embodiment over the embodiment of FIGURE 1 is that phase shifter 16 providing a selected fixed phase-shift is inserted in the circuit between bridge terminal 5 and the input 33 of phase detector 25. The signal $e_\theta$ that appears across branch terminals 5–7 is applied to input 41 and the signal $e_1$ from power source 2 is applied to the other input 42 of the phase shifter 16. The signal from source 2 is applied as the bridge driving voltage to the terminals 5–6 of the bridge circuit 1 via transformer 10 in the same phase as the above-mentioned voltage $e_1$. Assuming that the phase difference between $e_1$ (at input 42 of phase shifter 16) and $e_\theta$ (at the other input 41) is $\theta$, the phase angle of the signal appearing at output 43 of phase shifter 16 relative to $e_1$ will be converted to $2\theta$. Thus the variable phase signal $e_{2\theta}$ having $2\theta$ phase angle is applied as the standard phase signal to input 33 of phase detector 25. Therefore, the phase detector 25 responds to the relationship between output signal $e_o$ (or its amplified signal $e'_o$) of the bridge circuit 1 and the reference phase signal having a phase angle of $2\theta$ relative to the phase of driving signal $e_1$.

Figure 3:
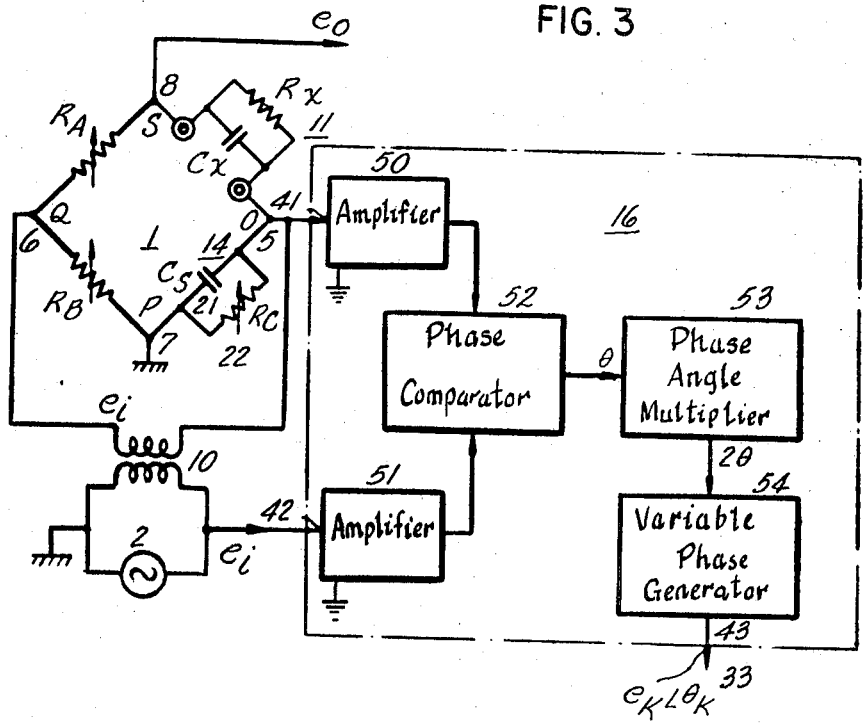
FIGURE 3 is a schematic diagram of a phase shifter used in the embodiment of FIGURE 2.

A typical circuit for phase shifter 16 of FIGURE 2 is shown in FIGURE 3. Signal $e_\theta$ taken from the 5–7 branch circuit is enhanced by high-input impedance amplifier 50 and is applied to an input of phase comparison circuit 52. Also, signal $e_1$ from power source 2 is amplified by amplifier 51 and is applied to another input of circuit 52. The phases of signals applied to the two inputs of phase comparison circuit 52 are compared to produce a signal $e_\theta$ at the output thereof for a signal $e_o$ having a phase angle $\theta$ relative to the phase of the output of power source 2. This signal $e_\theta$ is applied to phase angle multiplier 53 where it is converted to a phase angle signal (called $2\theta$ signal) corresponding to $2\theta$. This $2\theta$ signal is fed into variable phase generator 54 which generates output signal $e_k \angle \theta_k$ (at the same frequency $f$ as the signal $e_1$ from power source 2; its phase controlled by $2\theta$ signal, and having $2\theta$ phase angle relative to $e_1$). This signal is applied to input 33 of phase detector 25 of the circuit of FIGURE 2, either directly through switch 55 set in the RESISTIVE position (for resistive variable element in circuit 15) or through the 90° shifter 57 with switch 55 set in the REACTIVE position (for reactive variable element in circuit 15).

The output of phase detector 25 is amplified by DC amplifier 27 and its output signal $e_c$ is applied to variable resistance circuit 15 which may include the variable resistance element 22 and the associated device 28 which controls the resistance in response to $e_c$ and which is connected in parallel with standard capacitor 21 by means of manual switch 40. A calibrated variable resistor 22' may be switched into the circuit in place of the signal controlled resistor in order to obtain an accurate indication of dissipation or loss factor (D) of a capacitor being measured.

The measuring operation of the circuit of FIGURE 2 is not repeated here as it is substantially the same as that described in connection with FIGURE 1.

The operation of this invention may be described as follows: Assume the element being measured is a capacitor (with loss resistance $R_x$ and capacitance $C_x$), then the bridge circuit is reproduced in FIGURE 4. In this figure, O, Q are power source terminals, P, S are output terminals, and letter symbols on branches indicate values of the elements. The O—P—Q branch is generalized in the equivalent circuit of FIGURE 5(A) wherein $X_p$ indicates the equivalent reactance of branch OP.

Assuming that $OP/OQ$ is a vector voltage of branch OP when a unit voltage is applied between terminals O and Q in FIGURE 5(A), it can be presented in the following complex equation:

$$\frac{OP}{OQ} = \frac{R_p(R_o+R_p)}{(R_o+R_p)^2+\frac{(R_oR_p)^2}{X_p^2}} + j\frac{\frac{R_oR_p^2}{X_p}}{(R_o+R_p)^2+\frac{(R_oR_p)^2}{X_p^2}} \quad (1)$$

The first term of the right side is the in-phase component with the unit voltage of branch OQ. The second term is a quadrature component. Thus, from Equation 1:

$$x = \frac{R_p(R_o+R_p)}{(R_o+R_p)^2+\left(\frac{R_oR_p^2}{X_p}\right)} \quad (2)$$

$$y = \frac{\left(\frac{R_oR_p}{X_p}\right)R_p}{(R_o+R_p)^2+\left(\frac{R_oR_p}{X_p}\right)^2} \quad (3)$$

Therefore, on a complex plane, placing the origin point at O and assuming that straight line $\overline{OQ}$ is the unit vector on the real axis, the electric potential at point P can be indicated by coordinates $(x, y)$ on the complex plane, and the voltage of OP by vector line $\overline{OP}$, which is called $\overline{OP}$ vector in FIGURE 7.

Eliminating $R_o$ from (2) and (3), we get $$(x-1/2)^2+\left(y+\frac{X_p}{2R_p}\right)^2 = (1/2)^2+\left(\frac{X_p}{2R_p}\right)^2 \quad (4)$$

Therefore, when $R_o$ is varied, the locus of $\overline{OP}$ vector head draws an arc with $$\left(1/2, -\frac{X_p}{2R_p}\right)$$

as the center and with a radius of $$\sqrt{1/4+X_p^2/4R_p^2}$$

Also, eliminating $R_p$ from (2) and (3), we get $$x^2+\left(y-\frac{X_p}{2R_p}\right)^2 = \left(\frac{X_p}{2R_p}\right)^2 \quad (5)$$

Therefore, when $R_p$ is varied, the locus of P is an arc with $$\left(0, \frac{X_p}{2R_o}\right)$$

as the center and with $$\frac{X_p}{2R_o}$$

as radius.

And assuming $X_p > 0$, i.e. $X_p$ is inductive reactance, $$x > 0, \ y > 0 \qquad (6)$$

If $X_p < 0$ i.e. $X_p$ is capacitive reactance, $$x > 0, \ y < 0 \qquad (7)$$

Figure 6 shows the locus chart of point P when two of $X_p$, $R_p$, and $R_o$ are given fixed values and the remaining one is varied. As indicated in the diagram, when $X_p$ is capacitive reactance, point P is in the lower semi-circle of the circle with diameter OQ on the complex plane.

Now, with reference to FIGURE 4(A), assume the constants of all elements are as known, then by replacing $R_B$ by $R_o$, $R_c$ by $R_p$ and $$\frac{1}{2\pi f C_T}$$

by $X_p$ on branch O—P—Q, in reference to FIGURE 6, the vectors $\overline{OP}$, $\overline{PQ}$ and $\overline{OQ}$ in FIGURE 7 are obtained (hereinafter, ¯ over letter symbols indicate vector). Similarly, by replacing $R_A$ by $R_o$, $R_x$ by $R_p$ and $$\frac{1}{2\pi f C_X}$$

by $X_p$, vectors of $\overline{OS}$, $\overline{SQ}$ and $\overline{OQ}$ are obtained. If the constants of branch O—S—Q are fixed, point S will be fixed at a point. If $R_B$ on branch O—P—Q is kept constant and $R_c$ is varied, head P of $\overline{OP}$ vector moves on a locus (a) which is defined by the value of $R_B$, and the signal between output terminals S and P is shown by $\overline{SP}$. When $R_c$ is varied by a very small $\Delta R_c$ under this condition, the corresponding variation of voltage vector $\overline{SP}_v$ on branch SP is $\overline{PP}_v$ which again indicates the corresponding variations of voltage vector $\overline{OP}$ on branch OP. If $\Delta R_c$ is small enough, and consequently $\overline{PP}_v$ is very small, the direction of $\overline{PP}_v$, i.e. the direction of the corresponding variation $\Delta P$ (of output voltage $e_o$), will be identical with that of tangent at P of locus circle (a). When $P_0$ is the point of intersection between (a) and the line that connects S and the center F of locus circle (a), $\overline{SP}_p$ designates the minimal value of output voltage $e_o$. When $R_c$ is varied up or down at this time by a very small $\Delta R_c$, the direction of the corresponding variation $\Delta e_o$ (of output voltage $e_o$) will be identical to the direction of the tangent at $P_0$ (of locus circle a). As a special case, when the bridge is balanced at zero, the corresponding variation of output voltage $e_o$ for very small variation in $R_c$ is $e_o$ itself.

In the automatic control system including variable resistor $R_c$, as shown in FIGURES 1 and 2, if $\angle \theta_k$ represents the phase angle of standard phase signal $e_k$ which is applied to phase detector 25, the sensitivity of the phase detector 25 is at a maximum when $\angle \theta_k$ is equal to the phase angle separation between output voltage $e_o$ and the driving voltage $e_1$ (this occurs close to where output voltage $e_o$ is at a minimum or is zero at balance). In other words, in FIGURE 7, if $\angle \varphi$ represents the angle of intersection between tangent C at $P_0$ on locus circle $a$ and $\overline{OQ}$, the detector sensitivity is at a maximum at the point where $e_o$ is minimum or at zero balance when $\angle \theta_k$ equals $\angle \varphi$. Since $\angle \varphi$ is a variable relative to the direction of $\overline{OP}$ and the position of point S, $\angle \theta_k$ must also be varied according to $\angle \varphi$ for phase detector 25 to function at maximum efficiency over a wide range of points S.

Below is generally explained the phase relation between $\Delta P$ (output voltage $e_o$ variations corresponding to changes of variable resistance $R_c$) and the driving voltage $e_1$. In the complex plane of FIGURE 8 ($-y$ axis is drawn upward in the diagram) $\overline{OP}$ is drawn similar to that shown in FIGURE 7 and F is the center of the locus circle a (locus circle of $R_p$ when $R_o$ is constant) which passes P, and the tangent at P and real axis OX meet at D. Then:

$$\angle FPD = \angle FOQ = 90° \qquad (8)$$

Since $\overline{OF} = \overline{FP}$, $$\angle FOP = \angle FPO \qquad (9)$$

Assuming that phase angle between $\overline{OP}$ and $\overline{OQ}$ is $\angle \theta$, from (8) and (9):

$$\angle POD = \angle OPD = \angle \theta \qquad (10)$$

$$\angle PDQ = \angle POD + \angle OPD \qquad (11)$$

Substituting (10) in (11):

$$\angle PDQ = 2 \angle \theta \qquad (12)$$

Therefore, the angle which corresponding variation $\Delta P$ vector makes with driving voltage $e_1$ ($\overline{OQ}$) is twice the angle of $\angle \theta$ between $\overline{OP}$ voltage (the voltage at both ends of parallel impedance of $R_c$ and $C_T$) and driving voltage $e_1$ ($\overline{OQ}$).

In the control systems of conventional automatic balancing bridges of this kind, the phase of standard phase signal $e_k$ is fixed in relation to bridge driving voltage $e_1$ (for example, phase angle $\theta_k = -90°$). Under such a system, it is extremely difficult to make the phase detector function with uniformly high sensitivity over the entire range of bridge operation. However, in the present invention, the standard phase signal $e_k$ with a phase angle $\angle \theta_k = 2 \angle \theta$ (variable phase) is produced and applied to the phase detector 25 as the phase reference signal so that the phase detector functions always at maximum sensitivity throughout the entire operating range.

In the examples explained so far, the automatically controlled variable element has been a resistance element, but it should be understood that this invention may also use a variable reactance element $X_p$ as the signal-controlled variable element. In this case, the standard phase signal applied to the phase detector which produces the signal that controls the variable reactance element should have a 90° phase shift from the phase $\theta_k$ of the standard phase signal. This 90° phase shift may be introduced, as shown in FIGURE 2, by conventional means in the 90° shifter 57 with switch 55 set in the REACTIVE position.

This invention can also be applied to fully automatic bridge systems. For example, a bridge circuit may be used in the branch circuit O—P—Q of FIGURE 5(A) with $R_o$ fixed and elements $R_p$ and $X_p$ variable or with elements $R_s$ and $X_s$ variable in the circuit of FIGURE 5(B) and with the examples of this invention as explained above connected to control these variable elements. When reactance element $X_p$ or $X_s$ is fixed and resistance element $R_o$ is variable, $R_o$ can be automatically controlled by shifting the phase of the standard signal by 90° from the phase of standard phase signal of control system of $R_p$ or $R_s$. Also, this invention can be applied when the branch circuit which is connected in series with the variable impedance branch includes reactance elements. For example, with reference to FIGURE 5(A), when the branch element between P and Q is capacitive reactance element $X_o$, $X_p$ between OP is a fixed capacitive reactance and $R_p$ is a bridge circuit of a variable element, the phase of standard phase signal may be shifted 90° from phase $\theta_k$ which is present when the element in branch PQ is a resistance element. If $X_p$ is variable, it may be set at $\theta_k$. The same applies to the circuit of FIGURE 5(B), and also in the case where $R_o$ is replaced by an inductive reactance element $X_o$.

We claim:
1. A measurement bridge circuit comprising:
 a plural number of impedance means connected in a bridge configuration with at least one of said impedance means including a circuit element that changes impedance in response to a control signal applied thereto;
 a source of signal connected to one pair of oppositely disposed common connections of impedance means;

phase detector means having an input connected to receive the signal appearing across the remaining pair of oppositely disposed common connections of impedance means and having another input;

circuit means responsive to the signal appearing across said one pair of connections and the signal appearing across said one impedance means, respectively, and connected to the other input of the phase detector means for applying a reference signal thereto which has a phase angle relative to the signal appearing across said one pair of oppositely disposed common connections which is substantially two times the phase angle of the signal appearing across the one impedance means which includes said circuit element relative to the signal appearing across said pair of oppositely disposed common connections, said phase detector means producing a control signal representative of the phase relationship between the signals applied to the inputs thereof; and means coupled to said circuit element for altering the impedance thereof in response to said control signal.

2. A measurement bridge circuit as in claim 1 wherein:
said circuit means is connected to apply to the other input of the phase detector means a signal shifted in phase 90° from the phase angle of said reference signal.

References Cited
UNITED STATES PATENTS 2,968,180   1/1961   Schafer _____ 324—57 XR

FOREIGN PATENTS 121,862   6/1957   U.S.S.R.

EDWARD E. KUBASIEWICZ, Primary Examiner

UNITED STATES PATENT OFFICE
CERTIFICATE OF CORRECTION

Patent No. 3,474,334            October 21, 1969

Giichi Yokoyama et al.

It is certified that error appears in the above identified patent and that said Letters Patent are hereby corrected as shown below:

Column 4, equation 5 should appear as shown below:

$$x^2 + (y - \frac{X_p}{2R_o})^2 = (\frac{X_p}{2R_o})^2$$

Signed and sealed this 13th day of October 1970.

(SEAL)
Attest:

Edward M. Fletcher, Jr.
Attesting Officer

WILLIAM E. SCHUYLER, JR.
Commissioner of Patents